(12) United States Patent
Farrar et al.

(10) Patent No.: US 9,268,601 B2
(45) Date of Patent: Feb. 23, 2016

(54) API FOR LAUNCHING WORK ON A PROCESSOR

(75) Inventors: Timothy Paul Lottes Farrar, San Jose, CA (US); Ignacio Llamas, Sunnyvale, CA (US); Daniel Elliot Wexler, Soda Springs, CA (US); Craig Ross Duttweiler, San Carlos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 197 days.

(21) Appl. No.: 13/077,806

(22) Filed: Mar. 31, 2011

(65) Prior Publication Data

US 2011/0247018 A1   Oct. 6, 2011

Related U.S. Application Data

(60) Provisional application No. 61/321,096, filed on Apr. 5, 2010.

(51) Int. Cl.
*G06F 9/48* (2006.01)

(52) U.S. Cl.
CPC .................................. *G06F 9/4843* (2013.01)

(58) Field of Classification Search
None
See application file for complete search history.

(56) References Cited

U.S. PATENT DOCUMENTS

| | | | | |
|---|---|---|---|---|
| 6,148,323 | A * | 11/2000 | Whitner et al. | 718/105 |
| 7,526,634 | B1 * | 4/2009 | Duluk et al. | 712/216 |
| 7,577,762 | B1 * | 8/2009 | Garlick et al. | 710/6 |
| 7,594,095 | B1 * | 9/2009 | Nordquist | 712/22 |
| 7,640,284 | B1 * | 12/2009 | Goodnight et al. | 708/404 |
| 7,681,077 | B1 * | 3/2010 | Eitzmann et al. | 714/21 |
| 2008/0018652 | A1 * | 1/2008 | Toelle et al. | 345/506 |
| 2010/0262975 | A1 * | 10/2010 | Reysa et al. | 718/105 |
| 2012/0096040 | A1 * | 4/2012 | Schreter | 707/792 |

* cited by examiner

*Primary Examiner* — Tuan Dao
(74) *Attorney, Agent, or Firm* — Artegis Law Group, LLP

(57) ABSTRACT

One embodiment of the present invention sets forth a technique for launching work on a processor. The method includes the steps of initializing a first state object within a memory region accessible to a program executing on the processor, populating the first state object with data associated with a first workload that is generated by the program, and triggering the processing of the first workload on the processor according to the data within the first state object.

27 Claims, 4 Drawing Sheets

API FOR LAUNCHING WORK ON A PROCESSOR

CROSS-REFERENCE TO RELATED APPLICATIONS

This application claims benefit of United States provisional patent application entitled "CULauncher API for Computer GWC" filed on Apr. 5, 2010 and having a Ser. No. 61/321,096.

BACKGROUND OF THE INVENTION

1. Field of the Invention

Embodiments of the present invention relate generally to processor architectures and, more specifically, an application program interface (API) for launching work on a processor.

2. Description of the Related Art

In conventional computer systems, the processing power of a central processing unit (CPU) may be augmented by a co-processor, such as a GPU. GPUs are specialized processors that are configured to efficiently perform graphics processing operations or other operations that would otherwise be performed by the CPU. Some conventional computer systems are configured with a hybrid graphics system that includes, for example, an integrated GPU (iGPU) disposed on the motherboard along with the CPU and a discrete GPU (dGPU) located on an add-in card that is connected to the motherboard via a Peripheral Component Interconnect Express (PCI Express or PCIe) expansion bus and slot.

Typically, in such systems, work on the co-processor can only be launched by the CPU. Such a limitation can result in several inefficiencies. For example, if the co-processor is to execute a series of related tasks, where task B is dependent on the execution of task A, then the CPU will first launch task A on the GPU, wait until task A completes, and then launch task B. In such a scenario, because the CPU has to wait until the GPU indicates that task A has completed and then initiate the execution of task B, many clock cycles are wasted, thus reducing the overall performance of the system.

As the foregoing illustrates, what is needed in the art is an approach for launching work on a processor in a more efficient manner.

SUMMARY OF THE INVENTION

One embodiment of the present invention sets forth a method for launching work on a processor. The method includes the steps of initializing a first state object within a memory region accessible to a program executing on the processor, populating the first state object with data associated with a first workload that is generated by the program, and triggering the processing of the first workload on the processor according to the data within the first state object.

One advantage of the disclosed technique is that work can be launched on a processor from within the processor itself, thus eliminating wasted cycles in between the launching of two different tasks.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
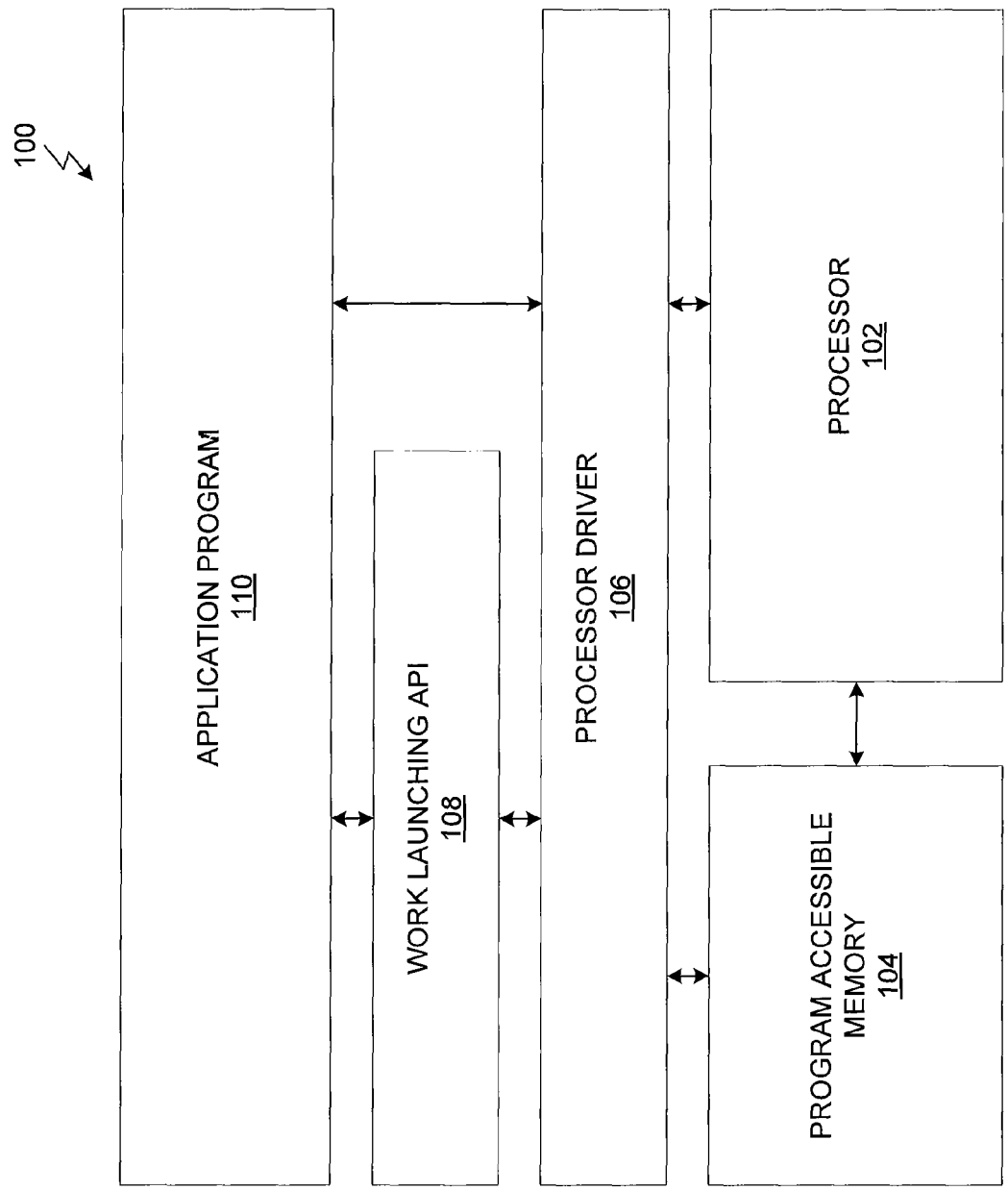
FIG. 1 illustrates a processing environment configured to implement one or more aspects of the present invention.

FIG. 1 illustrates a processing environment 100 configured to implement one or more aspects of the present invention. The processing environment 100 includes a processor 102, a program accessible memory 104, a processor driver 106, a work launching application program interface (API) 108 and an application program 110.

The processor 102 is coupled to the program accessible memory 104 and the processor driver 106. In operation, the processor 102 includes one or more processor cores that each executes a sequence of instructions associated with and/or transmitted by the various elements of the processing environment 100, such as the application program 110. The processor 102 can be a general purpose processor or a more special purpose processor, such as a graphics processing unit (GPU). The program accessible memory 104 is a memory space, usually a random access memory (RAM), that temporarily stores data needed to execute instructions within the processor 102. The data in the program accessible memory 104 can be set via software programs running within the system 100 at any given time.

In operation, software programs, such as application program 110, interact with the processor 102 via the processor driver 106. More specifically, the processor driver 106 transmits commands generated by the application program 110 to the processor 102 for execution. In some cases, to initiate execution of a particular workload within the processor 102, the application program 110 interfaces with the processor 102 via the work launching API 108. The work launching API 108 interfaces with the processor driver 106 and allows the application program 110 to launch workloads for execution on the processor 102.

To launch a workload, the application program 110 interacts with different API commands of the work launching API 108 to (i) allocate memory space in the program accessible memory 104 for a state object, (ii) store state information needed to execute the workload within the state object and (iii) trigger the execution of the workload. In one embodiment, the same state object may be shared across multiple workloads triggered by the application program 110 via the work launching API 108. In an another embodiment, where the processor 102 is a multi-threaded processor, different threads within the processor 102 may execute the same workload using different state objects stored within the program accessible memory 104. In yet another embodiment, a workload that is dependent on a primary workload which is currently being executed by the processor 102 can be automatically launched for execution within the processor 102 when the primary workload has been fully executed.

Figure 2:
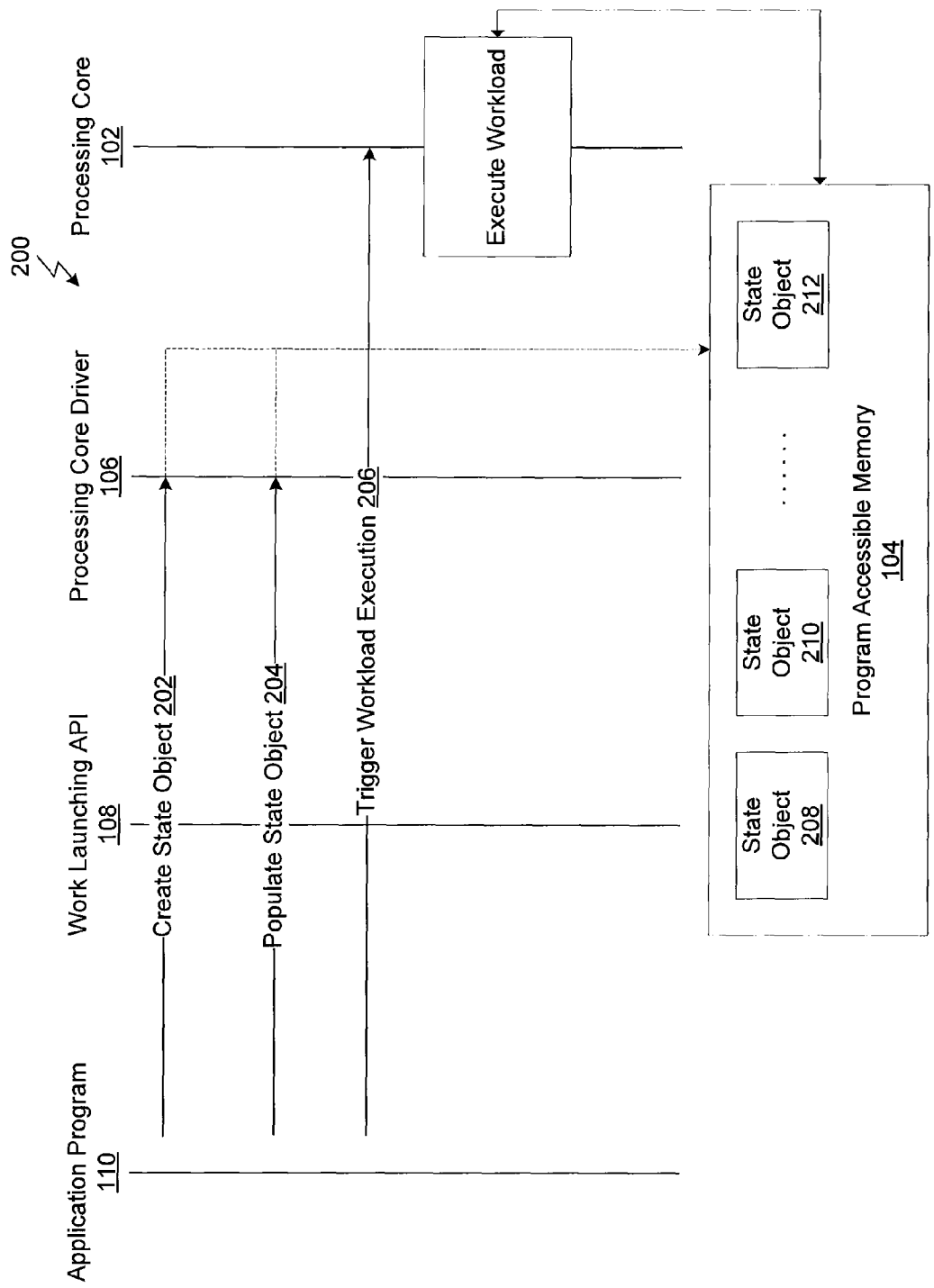
FIG. 2 is a timeline view when launching work within the processing environment of FIG. 1, according to one embodiment of the invention.

FIG. 2 is a timeline view 200 when launching work within the processing environment 100 of FIG. 1, according to one embodiment of the invention. As shown, there are three different steps for launching work on the processor 102, creating a state object 202, populating the state object 204 and triggering the workload execution 206.

The work launching API 108 provides functions that can be issued by the application program 110 for each of the above steps. For creating a state object at step 202, the work launching API 108 provides functions for initializing a specified portion of memory within the program accessible memory 104 that is to be allocated to a state object needed for executing a workload. The state object 208, 210 and 212 illustrate state objects that have been initialized by the application program 110. The structure of the state object may be pre-defined or may be dynamic based on a specification provided by the application program 110. For populating the state object at step 204, the work launching API 108 provides functions for setting different pre-determined pieces of state information within the state object. State information can include specifying a number of threads that will be executing the workload, memory management information or texture information in the case of graphics processing. Examples of specific functions providing by the work launching API 108 for setting state information in the state object are listed below. For triggering the workload execution at step 208, the work launching API 108 provides functions for submitting the state object and launching the execution of the workload using the state object within the processor 102.

Figure 3:
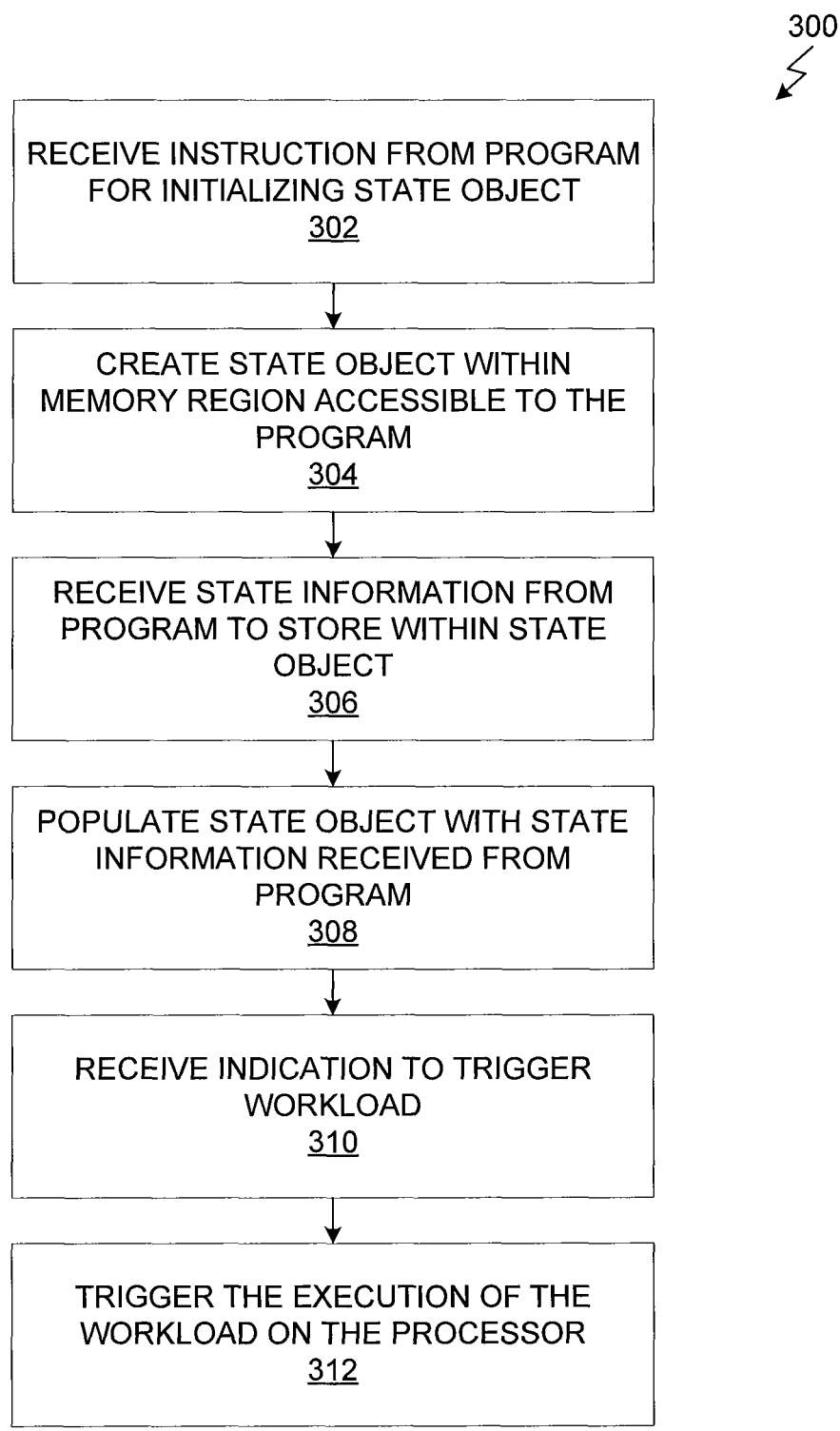
FIG. 3 is a flow diagram of method steps for launching a workload generated by an application program on a processor, according to one embodiment of the invention.

FIG. 3 is a flow diagram of method steps for launching a workload generated by an application program on a processor, according to one embodiment of the invention. Although the method steps are described in conjunction with the system for FIG. 1, persons skilled in the art will understand that any system configured to perform the method steps, in any order, is within the scope of the invention.

The method 300 begins at step 302, where the work launching API 108 receives an instruction from the application program 110 to initialize a state object within the program accessible memory 104. The application program 110, via at least one function provided by the work launching API 108, specifies a size of memory to be allocated to the state object. In response, at step 304, the state object specified by the application program 110 is created within the program accessible memory 104.

At step 306, the work launching API 108 receives state information from the application program 110 for storing in the state object created at step 304. The application program 110, via at least one function provided by the work launching API 108, specifies the different pieces of state information that are to be set within the state object. In response, at step 308, the state object is populated with the state information specified by the application program 110.

At step 310, the work launching API 108 receives an indication from the application program 110 that a workload associated with the state object should be triggered within the processor 102. At step 314, the execution of the workload is triggered within the processor 102.

Figure 4:
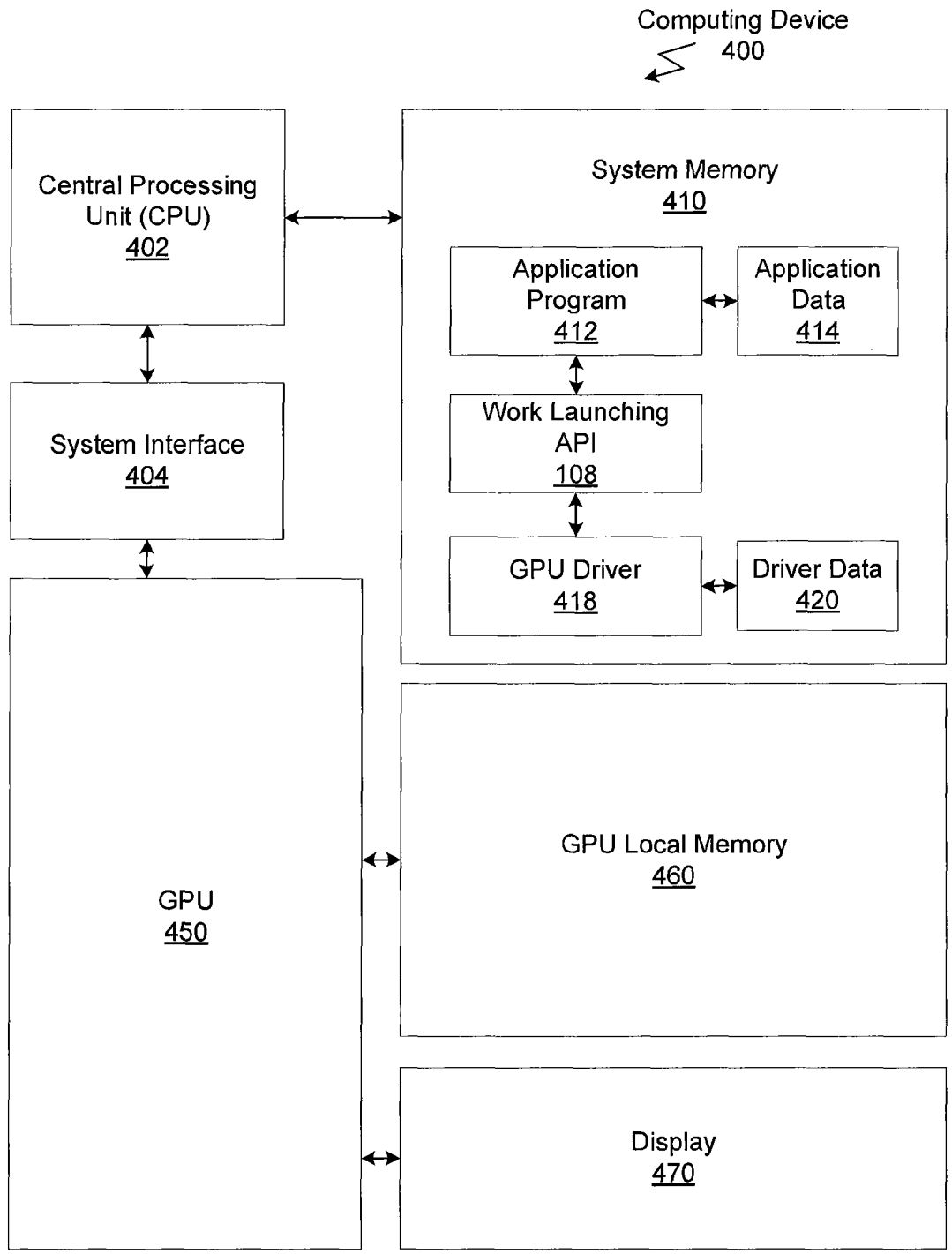
FIG. 4 is a conceptual diagram of a computing device configured to implement one or more aspects of the present invention.

FIG. 4 is a conceptual diagram of an exemplary computing device 400 configured to implement one or more aspects of the present invention. The computing device 400 includes a central processing unit (CPU) 402, a system interface 404, a system memory 410, a GPU 450, a GPU local memory 460 and a display 470.

The CPU 402 connects to the system memory 410 and the system interface 404. The CPU 402 executes programming instructions stored in the system memory 410, operates on data stored in system memory 410 and communicates with the GPU 450 through the system interface 404, which bridges communication between the CPU 402 and GPU 450. In alternate embodiments, the CPU 402, GPU 450, system interface 404, or any combination thereof, may be integrated into a single processing unit. Further, the functionality of GPU 450 may be included in a chipset or in some other type of special purpose processing unit or co-processor. The system memory 410 stores programming instructions and data for processing by the CPU 402. The system memory 410 typically includes dynamic random access memory (DRAM) configured to either connect directly to the CPU 402 (as shown) or alternately, via the system interface 404. The GPU local memory 460 is any memory space accessible by the GPU 450 including local memory, system memory, on-chip memories, and peer memory. In some embodiments, the GPU 450 displays certain graphics images stored in the GPU local memory 460 on the display 470.

In one embodiment, the GPU 450 includes a number M of SPMs (not shown), where M≥1, each SPM configured to process one or more thread groups. The series of instructions transmitted to a particular GPU 450 constitutes a thread, as previously defined herein, and the collection of a certain number of concurrently executing threads across the parallel processing engines (not shown) within an SPM is referred to herein as a "warp" or "thread group." As used herein, a "thread group" refers to a group of threads concurrently executing the same program on different input data, with one thread of the group being assigned to a different processing engine within an SPM. A thread group may include fewer threads than the number of processing engines within the SPM, in which case some processing engines will be idle during cycles when that thread group is being processed. A thread group may also include more threads than the number of processing engines within the SPM, in which case processing will take place over consecutive clock cycles. Since each SPM can support up to G thread groups concurrently, it follows that up to G*M thread groups can be executing in GPU 450 at any given time.

Additionally, a plurality of related thread groups may be active (in different phases of execution) at the same time within an SPM. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM, and m is the number of thread groups simultaneously active within the SPM. The size of a CTA is generally determined by the programmer and the amount of hardware resources, such as memory or registers, available to the CTA.

The system memory 410 includes an application program 412, application data 414, the work launching API 108, a GPU driver 418 and GPU driver data 420. The application program 412 generates calls to a the work launching API 108 as previously described in order to create state objects within the GPU local memory 460 and trigger the execution of workloads on the GPU 450 using those state objects.

Table 1 includes a list of functions provided by the work launching API 108 for creating and populating state objects as well as triggering the execution of workloads on the processor 102.

TABLE 1

| FUNCTION NAME | INPUTS | DESCRIPTION |
| --- | --- | --- |
| Create State Object Function | | |
| launcherInitialize | launcher: Launcher memory to initialize. func: Device-side function for the launcher, or NULL. | Initializes a state object. |
| Populate State Object Functions | | |
| launcherSetCtaWidth | launcher: Handle to initialized launcher. ctaWidth: Width of the CTA. | Set the width of each CTA in threads, must be >0, default is zero. |
| launcherSetCtaHeight | launcher: Handle to initialized launcher. ctaHeight: Height of the CTA. | Set the height of each CTA in threads, must be >0, default is zero. |
| launcherSetCtaDepth | launcher: Handle to initialized launcher. ctaDepth: Depth of the CTA. | Set the depth of each CTA in threads, must be >0, default is zero. |
| launcherSetGridWidth | launcher: Handle to initialized launcher. gridWith: Width of the grid. | Set the width of the grid in CTAs, default is zero. |
| launcherSetGridHeight | launcher: Handle to initialized launcher. gridHeight: Height of the grid. | Set the height of the grid in CTAs, default is zero. |
| launcherSetSharedMemorySize | launcher: Handle to initialized launcher. memSize: Size of shared memory. | Sets the size in bytes of the dynamic shared memory used by the launched CTAs. |
| launcherSetRegisterCount | launcher: Handle to initialized launcher. regCount: Count of registers. | Overrides the compiler-generated register count for the launched CTAs. |
| launcherSetL1Configuration | launcher: Handle to initialized launcher. l1Config: Particular L1 condifguration. | Sets the L1 Cache-shared memory configuration required by the launched CTAs. |
| launcherSetInvalidateTextureCache | launcher: Handle to initialized launcher. bool: invalidate. | If true, invalidate the texture cache (in the GPU memory) prior to launching work. False by default. |
| launcherSetInvalidateShaderCache | launcher: Handle to initialized launcher. bool: invalidate. | If true, invalidate the shader cache (in the GPU memory) prior to launching work. False by default. |
| launcherSetInvalidateConstantCache | launcher: Handle to initialized launcher. bool: invalidate. | If true, invalidate the constant cache (in the GPU memory) prior to launching work. False by default. |
| launcherSetParameterBuffer | launcher: Handle to initialized launcher. dParameterBuffer: pointer to parameter buffer. | Sets the pointer to a parameter buffer containing the data for the parameters in the kernel signature. |
| launcherSetExtraParameterBuffer | launcher: Handle to initialized launcher. dExtraParameterBuffer: pointer to extra parameter buffer. | Sets the pointer to an additional memory buffer that the user can read from in the launched task. |
| launcherSetAtCtaExitCallback | launcher: Handle to initialized launcher. cbLauncher: Handle to initialized callback launcher. cbParams: Pointer to callback parameters. | Support to launch grids of work directly at CTA exit without explicitly going through the command buffer. |
| launcherSetAtGridExitCallback | launcher: Handle to initialized launcher. cbLauncher: Handle to initialized callback launcher. | Support to launch grids of work directly at grid exit without explicitly going through the command buffer. |

TABLE 1-continued

| FUNCTION NAME | INPUTS | DESCRIPTION |
|---|---|---|
| | cbParams: Pointer to callback parameters. | |
| launcherSetQueueBuffer | launcher: Handle to initialized launcher. dQueueBuffer: pointer to queue buffer. | Specify queue storage for queue-based launchers. Each element in the queue contains the varying arguments to a CTA. |
| launcherSetQueueElementCount | launcher: Handle to initialized launcher. queueElementCount: Number of CTA elements in the queue storage array | Specify the number of elements in the queue associated with the launcher. |
| launcherSetQueueElementSize | launcher: Handle to initialized launcher. queueElementSize: Size of each CTA element in the queue storage array | Specify the size of each element in the queue associated with the launcher. |
| launcherSetLogicalSmDisabledMask | launcher: Handle to initialized launcher. smMask: A mask that determines the set of logical SM indices to which CTAs can be launched. | Sets a mask that determines the set of logical SM indices to which CTAs can be launched. |
| launcherSetPriority | launcher: Handle to initialized launcher. priority: Priority of the launcher having a value between 0 and a pre-determined value. | Sets the priority level of this launcher. |
| launcherSetAddToHeadOfPriorityLevel | launcher: Handle to initialized launcher. b: Boolean indicating whether the priority of the launcher should be considered. | If true, the scheduler will add the launcher to the head of the 'priority level' set with launcherSetPriority, otherwise the launcher is added to the tail. |
| Trigger Execution Functions | | |
| launcherFinalize | launcher: Handle to initialized launcher. | Notify GPU that the state object is configured and ready for work. |
| launcherReset | launcher: Handle to initialized launcher. | Reset a state object to allow its reuse. |
| launcherSubmitGrid | launcher: Handle to initialized launcher. | Launch a grid of work with grid width * height * depth CTAs for the specified launcher. |
| launcherSubmitGridCommands | launcher: Handle to initialized launcher. dstCmdBufSeg: Destination command buffer segment. | Writes into the given buffer the GPU commands required to launch a grid of work for the previously configured state object. |
| launcherSubmitQueueElements | launcher: Handle to initialized launcher. elementStart: Element index of first CTA to launch. elementCount: Number of element CTAs to launch. | Launch CTAs for a queue-based launcher using elements stored in the associated dQueueBuffer storage. |
| launcherInvalidateInstructionCache | launcher: Handle to initialized launcher. b: Boolean indicating whether instruction cache should be invalidated before the work is launched. | If true, invalidate the instruction cache prior to launching work. |

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for launching work on a processor, the method comprising:
    initializing, via an application programming interface (API), a first state object that is assigned to a first workload and resides within a memory region accessible to a program executing on the processor;
    populating the first state object with data that indicates a first number of cooperative thread arrays (CTAs) that are responsible for processing the first workload that is generated by the program, wherein the first number is greater than or equal to two;
    generating the first number of CTAs in order to process the first workload on the processor according to the data within the first state object;
    launching, via the API, the first number of CTAs for a queue-based launcher using data elements stored in a queue buffer; and
    invalidating, via the API, an instruction cache associated with the first data object prior to launching the first number of CTAs;
    wherein a structure of the first state object is dynamic.

2. The computer-implemented method of claim 1, wherein the step of initializing the first state object is performed when a first instruction is received from the program.

3. The computer-implemented of claim 2, wherein the first instruction specifies a portion of the memory region to be allocated to the first state object.

4. The computer-implemented method of claim 3, further comprising deallocating the portion of the memory region allocated to the first state object once the first workload has been processed.

5. The computer-implemented method of claim 1, wherein the data associated with the first workload comprises state information necessary to process the first workload.

6. The computer-implemented method of claim 5, wherein the state information is accessed when a second workload generated by the program is processed.

7. The computer-implemented method of claim 1, wherein the processor comprises a plurality of processing cores and processes the first workload with a first processing core.

8. The computer-implemented method of claim 7, further comprising:
    initializing a second state object within the memory region; and
    populating the second state object with additional data associated with the first workload,
    wherein the first workload is processed according to the additional data within the second state object by a second processing core of the processor.

9. The computer-implemented method of claim 1, wherein a second workload that is generated by the program is dependent on a result generated from the processing of the first workload, and further comprising automatically triggering the processing of the second workload on the processor according to the result when the first workload has been processed.

10. The computer-implemented method of claim 1, wherein the result of the execution of the first workload is stored in the memory region.

11. The computer-implemented method of claim 1, wherein the data included in the first state object further indicates a second number of threads in each cooperative thread array, and wherein generating the first number of CTAs further comprises generating the second number of threads for each CTA in order to process the first workload.

12. The computer-implemented method of claim 1, wherein the API includes a first function configured to initialize the first state object.

13. The computer-implemented method of claim 12, wherein the API further includes a second function configured to populate the first state object with the data and a third function configured to launch the first workload.

14. The computer-implemented method of claim 13, wherein the API further includes a fourth function configured to set parameters associated with the first number of CTAs.

15. The computer-implemented method of claim 14, wherein:
    initializing the first state object comprises invoking the first function;
    populating the first state object comprises invoking the second function; and
    generating the first number of CTAs comprises invoking the fourth function.

16. The computer-implemented method of claim 1, further comprising resetting, via the API, the first state object such that the first state object can be reused.

17. The computer-implemented method of claim 1, wherein the structure of the state object is specified by the program.

18. A non-transitory computer readable medium storing instructions that, when executed by a processor, cause the processor to launch work, by performing the steps of:
    initializing, via an application programming interface (API), a first state object that is assigned to a first workload and resides within a memory region accessible to a program executing on the processor;
    populating the first state object with data that indicates a first number of cooperative thread arrays (CTAs) that are responsible for processing the first workload that is generated by the program;
    generating the first number of CTAs in order to process the first workload on the processor according to the data within the first state object; and
    invalidating, via the API, a cache associated with the first data object prior to launching the first number of CTAs.

19. The non-transitory computer readable medium of claim 18, wherein the step of initializing the first state object is performed when a first instruction is received from the program.

20. The non-transitory computer readable medium of claim 19, wherein the first instruction specifies a portion of the memory region to be allocated to the first state object.

21. The non-transitory computer readable medium of claim 20, further comprising deallocating the portion of the memory region allocated to the first state object once the first workload has been processed.

22. The non-transitory computer readable medium of claim 18, wherein the data associated with the first workload comprises state information necessary to process the first workload.

23. The non-transitory computer readable medium of claim 22, wherein the state information is accessed when a second workload generated by the program is processed.

24. The non-transitory computer readable medium of claim 18, wherein the processor comprises a plurality of processing cores and processes the first workload with a first processing core.

25. The non-transitory computer readable medium of claim 24, further comprising:
   initializing a second state object within the memory region; and
   populating the second state object with additional data associated with the first workload,
   wherein the first workload is processed according to the additional data within the second state object by a second processing core of the processor.

26. The non-transitory computer readable medium of claim 18, wherein a second workload that is generated by the program is dependent on a result generated from the processing of the first workload, and further comprising automatically triggering the processing of the second workload on the processor according to the result when the first workload has been processed.

27. A computer system, comprising:
   a memory; and
   a processor that:
      initializes, via an application programming interface (API), a first state object that is assigned to a first workload and resides within a memory region accessible to a program executing on the processor,
      populates the first state object with data that indicates a first number of cooperative thread arrays (CTAs) that are responsible for processing the first workload that is generated by the program,
      generates the first number of CTAs in order to process the first workload on the processor according to the data within the first state object, and
      invalidates, via the API, a cache associated with the first data object prior to launching the first number of CTAs.

* * * * *